(12) United States Patent
Franke et al.

(10) Patent No.: US 6,976,112 B2
(45) Date of Patent: Dec. 13, 2005

(54) APPARATUS, METHOD AND PROGRAM PRODUCT FOR AUTOMATICALLY DISTRIBUTING POWER TO MODULES INSERTED IN LIVE CHASSIS

(75) Inventors: Jeffery Michael Franke, Apex, NC (US); Donald Eugene Johnson, Apex, NC (US); Michael Scott Rollins, Durham, NC (US); David Robert Woodham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 10/306,305

(22) Filed: Nov. 27, 2002

(65) Prior Publication Data

US 2004/0117536 A1   Jun. 17, 2004

(51) Int. Cl.[7] ................................................ G06F 1/26
(52) U.S. Cl. ...................................... 710/302; 709/203
(58) Field of Search ............................... 710/300–304, 710/313, 10, 17, 104; 713/324, 330, 1, 300, 713/310, 100; 714/14; 709/203; 700/295; 307/125; 370/910

(56) References Cited

U.S. PATENT DOCUMENTS 5,416,834 A * 5/1995 Bales et al. ............. 379/211.02
5,930,496 A * 7/1999 MacLaren et al. ............. 703/23
5,943,232 A * 8/1999 Gehi et al. ..................... 700/79
6,295,566 B1 * 9/2001 Stufflebeam ................. 710/302
6,473,827 B2 * 10/2002 McMillen et al. ........... 710/316
6,687,837 B1 * 2/2004 Beck ........................... 713/300

OTHER PUBLICATIONS

"Study of gated pnp as an ESD protection device for mixed-voltage and hot-pluggable circuit applications" by Minh Toug; Gauthier, R.; Gross, V. (abstract only) publication Date: Sep. 10-12, 1996.*

"Meeting IEEE 1394 (Firewire) overcurrent protection requirements" by Wiener, P. (abstract only) Publication Date Oct. 21-23, 1998.*

* cited by examiner

*Primary Examiner*—Gopal C. Ray
(74) *Attorney, Agent, or Firm*—Joscelyn G. Cockburn; Dillon & Yudell LLP

(57) ABSTRACT

When a blade and/or interconnect device is inserted into the chassis of a powered or live server the procedure is known as hot-plugging. Before power is applied to the hot-plugged blade and/or interconnect device the fabric type of already installed blades and/or interconnect devices is correlated with fabric types of newly hot-plugged blade and/or interconnect device. Depending upon results of the correlation, power to the hot-plugged blade and/or interconnect device is allowed or denied.

19 Claims, 9 Drawing Sheets

APPARATUS, METHOD AND PROGRAM PRODUCT FOR AUTOMATICALLY DISTRIBUTING POWER TO MODULES INSERTED IN LIVE CHASSIS

CROSS-REFERENCE TO RELATED PATENT APPLICATION

The present invention relates to patent application Ser. No. 10/306,310 entitled "APPARATUS, METHOD AND PROGRAM PRODUCT FOR AUTOMATICALLY DISTRIBUTING POWER TO MODULES WITHIN A SERVER", by G. Dake, et al. filed concurrently herewith and assigned to the assignee of the present invention and is incorporated herein in its entirety.

BACKGROUND OF THE INVENTION

1. Field of the Invention

The present invention relates to communications network in general and in particular to the type of network devices termed "Servers".

2. Prior Art

The use of servers as devices within communications network is well known in the art. A server is equipment that makes available file, database, printing, facsimile, communications or other services to client terminals/stations with access to the network which the server serves. When the server permits client/terminal station access to external communications network it is sometimes known as a gateway. Servers are available in different sizes, shapes and varieties. Servers may be distributed throughout a network or they may be concentrated in centralized data centers. Notwithstanding, these differences there are certain inherent problems that must be addressed if the servers are going to function in an acceptable and reliable manner.

Probably, one of the most pressing problems associated with servers is manageability and particularly manageability as applied to chassis mounted servers. One aspect of manageability within this type of server relates to compatibility between components and power management. In particular, at what juncture of the configuration cycle should power be applied or allowed to be applied to components. Failure to apply power at the optimum juncture could result in damage to the components and down time for the server.

In past configurations a typical collection of servers would be connected to switches or hubs that require manual cabling and compatibility checking by an operator. Once these manual procedures were done power would then be applied to the servers and corresponding switches.

Manual compatibility checking and manual cabling are unacceptable due to the likelihood of human error which could result in damage to the equipment. In addition, operational cost is likely to be high due to cost associated with employing a service technician to perform the manual tasks enunciated above.

In view of the above problems a more efficient system and method is required to determine that interconnected subassemblies in the server are compatible before power is made available to said subassemblies.

SUMMARY OF THE INVENTION

One advantage of the present invention is that compatibility of modules is determined automatically, without the need for human intervention.

Another advantage of the present invention is that the likelihood of equipment damage due to the likelihood of human error is eliminated, since human intervention is not required.

Still another advantage of the present invention is the increased cost in operation due to cost associated with a technician is eliminated.

Still yet another advantage of the present invention is that the server can be placed at hard to reach locations. Because the system that performs the testing are built into the server and is activated as part of the initialization routine.

The present invention uses components and infrastructure already present in the server to perform the compatibility testing and powering of modules. In particular, a processor, preferably on the management module (MM), is programmed to determine the fabric type of modules and the fabric type of connectors providing interconnection between modules and communications highway or external networks. Once the information is gathered, the processor determines the dominant fabric type based upon a configuration that allows the most modules/connectors to be powered on. The processor causes power to be applied to all modules and connectors that are of the dominant fabric type. For example, if the dominant fabric type is ethernet then any module identifying itself as ethernet and communicating with ethernet protocol would be activated. Likewise, connectors identifying itself as ethernet are also activated with power.

Often times a blade and/or connector (hereafter chassis interconnect device) has to be inserted into a live or powered chassis. This process is known as hot plugging the module. Before permission to add power to the blade is granted or the interconnect fabric device is powered up, the controller correlates the fabric type of the blade and chassis interconnect device with the fabric type of the hot plugged module and based upon the results of the correlation permission to power up or not power up is granted to the module.

DETAILED DESCRIPTION OF THE ILLUSTRATED EMBODIMENT

Figure 1:
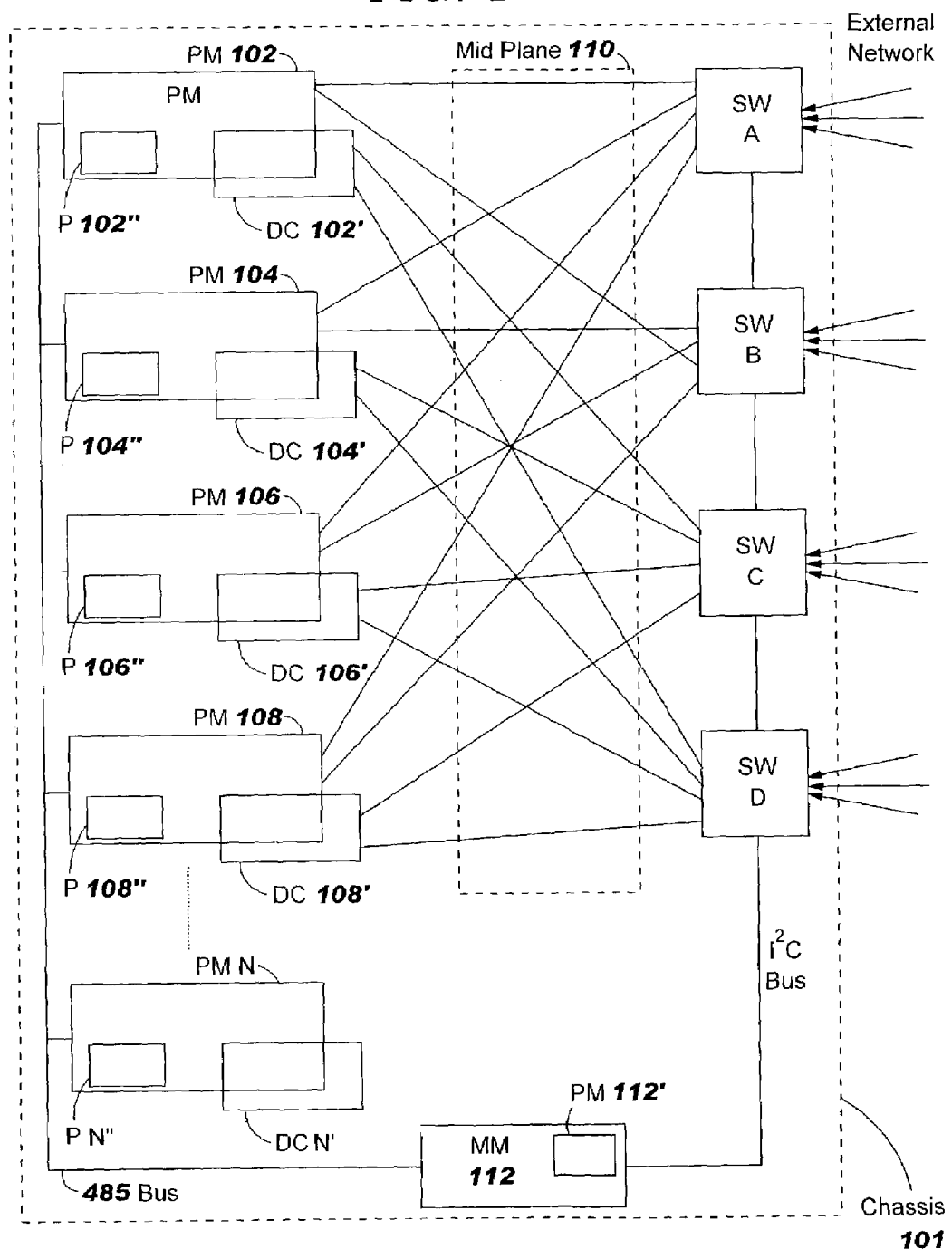
FIG. 1 shows a block diagram of a server embodying the teachings of the present invention.

The description which follows presupposes knowledge of data communications network, network devices, such as servers or the like, and protocols used for transmitting information within the network. As such, general information regarding any of the enunciated items will not be given herein. Suffice it to say that background information relative to these items can be found in the literature or on the following web sites and their successors. The web sites includes:

http://www.pc.ibm.com/us/eserver/xseries/
bladecenter_family.html?ca=xSeries&met=
ibmblade&me=A
http://www.carrieraccessbilling.com/telecommunications-glossary-s.asp FIG. 1 shows a block diagram of server 100 which embodies the teachings of the present invention. As indicated above and described in more detail hereinafter, the present invention relates to configuration of the server and applying power to the configured subsystems so that communications between subsystems or with the external networks or communications highway is made possible. The server 100 includes chassis 101 in which processor module (PM) 102 through PM N are mounted. A plurality of switches (SW) labelled SW A through SW D are also mounted within the chassis. Each switch has a plurality of ports interconnecting it to the external network and a plurality of ports connecting each switch through mid-plane 110 to the plurality of processor modules. As is used in this application 'processor module' and 'processor blades' or 'blade' are used interchangeably.

Still referring to FIG. 1, management module (MM) 112 is connected by I$^2$C Bus to each of the switches SW A through SW D. The management module 112 is also connected by 485 Bus to each of the processor modules PM 102 through PM N. Each of the processor modules has a 485 port which collects information from on-board processor (P) labelled P 102" through P N" and forwards the information over 485 Bus to the management module 112. Likewise, each of the switches SW A through SW D has an I$^2$C port which gathers or collects low level information and status from the switch module and forwards over I$^2$C bus to the management module.

Still referring to FIG. 1, the MidPlane 110 hereinafter called High Speed Interconnect Module 110 provides connectivity between the processor modules and the switches. For purposes of description the illustration in FIG. 1 shows the interconnection as wiring between the processor module and the switch to which it is connected. However, this showing is for illustration only since in an actual machine all the wiring is done on the support member of the high speed interconnect module 110 using printed circuit or some other appropriate technology. Connectors (not shown in the figure) are also provided on the interconnect module and both the switch and the processor module are plugged into respective connectors on the interconnect module. It should also be noted that the configuration (i.e. interconnection) between processor modules and switches are only exemplary and should not be construed as a limitation on the scope of this invention. Since the way in which the connection is done depends on consideration outside the scope of the present invention. However, for purposes of disclosing the invention processor module 102 has two ports, one of which is connected to SW A, the other connected to SW B. Likewise, PM 104, PM 106, PM 108 through PM N has two ports, each of which is connected through communication links to SW A and SW B. The other PM from PM 110–PM N would also have two ports connected to SW A and SW B, respectively. However, in order not to clutter the figure the connections are not shown.

Still referring to FIG. 1, each of the processor modules can be provided with a daughter card (DC). The daughter card attachment is optional. Therefore, although the figure shows that each of the PM's has a daughter card this is done for illustration only. Each daughter card and its associated processor modules have appropriate connectors for effectuating mating. As is shown in the figure, PM 102 has associated with it DC 102'. Likewise, PM 104 has DC 104' associated with it and so forth for the other processor modules and the associated daughter cards within the server 100. Each of the daughter cards DC 102' through DC N' has two ports, each one of which is connected to SW C and SW D, respectively. Access to the external network or communication highway for the daughter card is provided through SW C and SW D. It should also be noted that the two output ports on each daughter card are only exemplary and does not limit the scope of the present invention. Each of the processor modules is also provided with a processor labelled P102" to PN". The function of the processor on each of the processor modules include power management (i.e. activate or deactivate power on the PM on which it resides). The on board processor also collects other information such as temperature, etc. on its related PM and communicates with the processor 112' on the management module over 485 Bus. As will be explained hereinafter, it is the communication over the 485 bus that the processor 112', in the management module, obtains information regarding the type of PM module that is present in the server 100. Likewise, information from SW A through SW B is exchanged and the I$^2$C bus with the processor 112' in the management module 112. The processor 112' uses the information gathered to decide the dominant fabric type of the configuration. As used in this document dominant fabric type relates to the type of SW and PM that allow the maximum number of PMs and SWs to be powered on.

Still referring to FIG. 1, the switches SW A through SW D may be ethernet, fibre channel switch, Infiniband or any of the well known types of switches or connectors that provide connectivity to external networks. The illustration in FIG. 1 also shows that each processor module (PM) has connectivity through switch A and switch B. Likewise, each daughter card has connectivity through switch C and switch D. The management module 112 provides a single point of control for the server 100. Processor 112' is a configuration processor which executes a software program (to be described hereinafter), collects information from each PM over 485 Bus and from the switches over I$^2$C bus, analyzes the information, determine the compatibility of PM to switches, apply power to the appropriate switch and give permission for power to be applied to the appropriate processor module which has compatibility with the appropriate switch. Stated another way, the configuration subassembly of the present invention automatically detects the components (PM and SW) on each end of the high speed interconnect fabric 110 and ensures that they are compatible before allowing them to power on.

Figure 2:
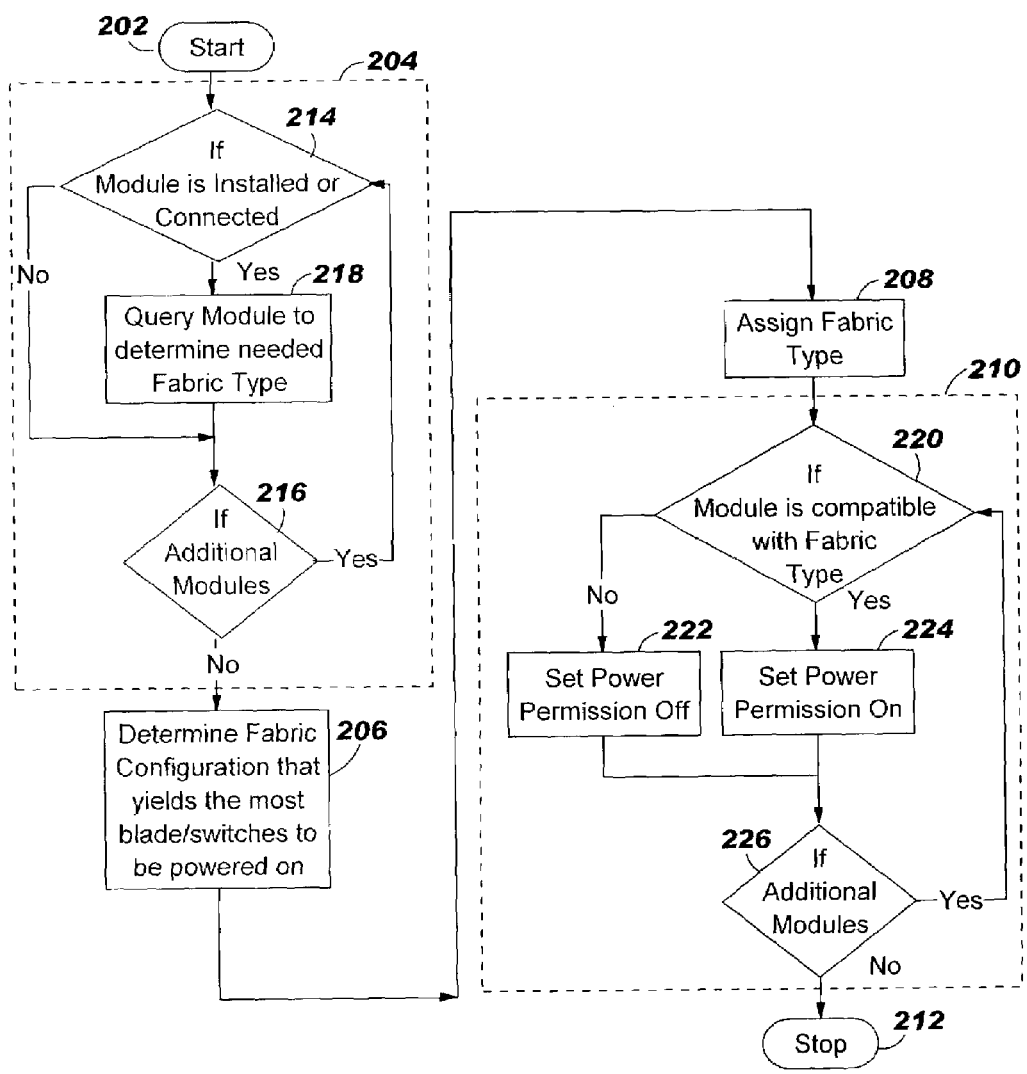
FIG. 2 shows a flowchart of the program executed on the processor to carry out the teachings of the present invention.

FIG. 2 shows a flowchart of the software program which is executed in processor 112'. The processor 112' may be any of the shelf processor which is programmed according to the teachings of the flowchart. In one embodiment of the present invention the processor was the PowerPC developed and market by IBM Corporation. Of course, other types of conventional processors may be used without deviating from the teachings of the present invention. The program as shown by the flowchart will first be described at a macro level followed by micro level description. The program begins in the start block 202 and descends into macro block 204 which is used to determine fabric type which could be ethernet, fibre, etc. The program then descends into macro block 206 in which the program determines the fabric configuration that results in most blades/switches to be powered on. It should be noted that the main focus of the configuration routine according to the teachings of the present invention is to power on the maximum number of processor modules associated daughter cards and switches that will provide maximum communications pathway in the router.

Still referring to FIG. 2, from block 206 the program selects the dominant fabric type block 208 and descends into macro block 210 which allows power on to the selected compatible processor module switch combination and descends into block 212 whereat the program stops or exits.

Still referring to FIG. 2, macro block 204 includes block 214 whereat the program determines if a module is installed or connected in a selected slot of the chassis. If the response is No the program enters block 216 where it checks if additional modules exist. If the answer is Yes the program exits block 216 along the Yes path and re-enters block 214. If the result of the tests from block 214 exit along the Yes path the program enters block 218 whereat it queries the modules to provide it with its fabric type. As is used herein fabric type means the type of communication supported by the module. As stated above this could be ethernet, fibre or any appropriate type of module. The query is done by the processor P112' FIG. 1 over the 485 Bus. As for the switch the interrogation is done over the I²C Bus. The response to the processor to each of the processor modules is provided by the on-board processor 102" through PM N". The response from the switch is obtained from information placed in selected portions of the memory within each of the switches by on-board controller (not shown) present in each of the switches.

Referring again to FIG. 2, if in block 216 there are no more modules the program exits along the No path into macro block 206. In macro block 206 the program utilizes the gathered information to determine the dominant or assigned fabric type 208. As stated before this is selected so that maximum number of processor modules and switches are powered on. From block 208 the program descends into block 220 whereat it is determined if a module is compatible with the selected fabric type (block 208). If the module is not compatible with the selected or assigned fabric type the program enters block 222 whereat power permission to the module is prohibited. As to the switch, if the switch does not match the assigned fabric type it is not turned on. With respect to block 220 if the module is compatible with the assigned fabric type the program descends into block 224. With respect to processor module or blade power permission to turn on the particular processor module is set. The setting is done in any well known appropriate way such as setting a bit within a register in the processor module. Depending on the setting of the bit the processor, such as P 102" through P N", turns on power to the associated module. With respect to switch the management module would turn on the power to the switch. From block 224 the program descends into block 226 where it determines if additional modules exist. If the response is Yes the program loops back to block 222 and the process previously described is executed. If the response is No the processor exits through the stop block 212.

Having described the details of an implementation according to the teachings of the present invention an example of how the invention functions with respect to a predefined configuration will now be given.

For purposes of the example the following switch configuration will be assumed. With respect to FIG. 1 SW A, SW B, and SW C are presumed to be ethernet switches. SW D is assumed to be a fibre channel switch. PM 102, PM 104, PM 106 and PM 108 are presumed to be ethernet fabric type.

Daughter card (DC) 102' is assumed to be an ethernet daughter card. Daughter card 104' is assumed to be inactive or inoperative. Stated another way, daughter card 104' is not in the network. Daughter card 106' and daughter card 108' are assumed to be fibre daughter cards. The processor P 112' in MM 112 sends out a query message asking each of the subassemblies such as the processor modules and the switches their fabric type. The processors P 102", P 104", P 106" and P 108" collect this information and forward it 485 Bus to the requesting processor P 112'. Likewise, processor 112' accesses the storage area in each switch where fabric type information is stored and obtained this information over the I²C bus. With this information present in P 112' it makes the decision based upon the dominant media type which will provide maximum number of processor modules and switches that can be activated. In this example the fabric type would be ethernet. Therefore, all processor modules which are of ethernet type and daughter card would be granted permission to power up. Likewise, all switches that are of ethernet type would be powered up by the management module 112. With this example PM 102, PM 104, PM 106 and PM 108 would be granted permission to power on. Likewise, DC 102' would also be powered on. Because SW A, SW B, SW C are ethernet switches they too would be powered on. However, DC 108' and DC 106' are fibre which was not elected. Therefore, they would remain in an OFF state. Likewise, SW D which is a fibre switch would remain in the OFF state.

Figure 3:
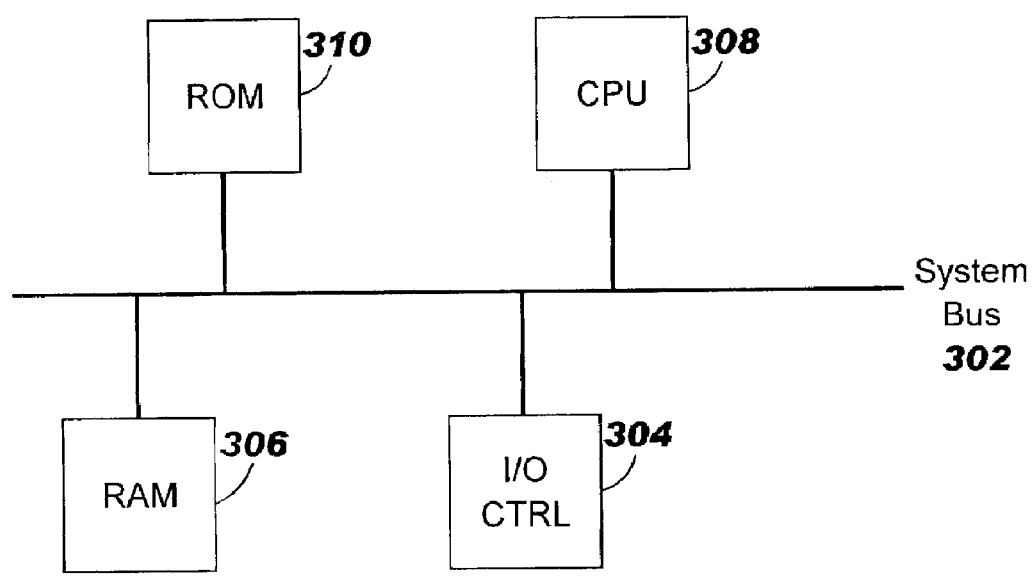
FIG. 3 shows a block diagram of the processor.

FIG. 3 represents the schematic for a processor which could execute the program shown in FIG. 2. This processor includes system bus 302 to which ROM 310, CPU 308, RAM 306 and I/O controller 304 are connected. The CPU 308 includes operating system, drivers and application programs. One of the application programs would be a program generated from the flowchart set forth in FIG. 2. Instructions for the CPU are stored in ROM 310. RAM 306 is used as a scratch memory for the CPU and for storing information that is inputted over the I/O controller to RAM 306. The I/O controller 304 also forms the interface for information provided by the processor modules and switches over Bus 485 and I²C bus, respectively. It should be noted that the showing of the processor in FIG. 3 is only exemplary and any type of processor could be used to perform the process steps set forth in FIG. 2.

In summary, the invention solves a manageability problem in a chassis with multiple blades and various interconnect connectors. An interconnect connector includes, but is not limited to an Ethernet switch, Fibre Channel Switch, or Serial port concentrator. Each blade or processor module (PM) in the chassis may have a daughter card that may communicate over the interconnect connector. The daughter cards, PM and the interconnect connectors must be of the same type, for compatibility to power on. Initially the types and quantities of interconnect connectors and PM are unknown. The Management Module (System Management Module) communicates to each PM over a bus to identify the connection type and the daughter card if it exists. The Management Module also communicates to each interconnect connector over a bus to identify the type of the interconnect connector, if it exists. The management module will then compute which servers and interconnect connectors will be granted power permission, or be powered on. The management module will use the bus to communicate to each PM that it has permission to power on and use the interconnect fabric, and communicate to each interconnect connector to power on. This gives a purpose to the interconnect fabric so that only compatible components can communicate on it. This is an ideal solution for a chassis of blade servers as it provides a built in high speed interconnect fabric which can be used for multiple purposes.

The description so far relates to a cold start system. As used in this application a cold start system is one in which power has not been applied to any of the Processor Modules or interconnect connectors.

The remaining portion of this document relates to the situation where a blade and/or interconnect device is inserted into a power on or live server blade chassis. This is also known as hot plugging.

When a blade is inserted into a live chassis, the blade may have incompatible Interconnect Fabric hardware installed. The blade cannot be allowed to power on if the Interconnect Fabric devices are incompatible. In some cases, physical damage may occur to the hardware.

To prevent damage, the blade is examined and the installed Interconnect Fabric hardware on the blade is assessed. At this time, based on information held on currently installed blades and currently installed Server Blade Chassis Interconnect devices, a decision to allow the new blade to power up is made.

In particular, information about the blades currently installed in the Server Blade Chassis and the Interconnect Fabric hardware installed in the Server Blade Chassis is collected and stored by the Service Processor. When a new Blade is inserted into the Chassis or a new interconnect fabric device is inserted into the chassis, The Server Processor will query the new device for its information. The onboard fabric interfaces, Optional fabric interfaces, power states of all existing Blades and, the newly inserted Blade are compared to each other, as well as, the type of Optional Interconnect Fabric hardware installed in the Chassis.

The first Blade with an Interconnect Fabric device that is inserted into a hot Server Blade Chassis along with the Interconnect Fabric hardware device in the chassis will dictate the Chassis power permission scheme. For example, if an Interconnect Fabric hardware device in the chassis is of type A and a Blade with type A Option card was allowed to power up then all future Blades that wish to power up must either have a type A Option card, Not have an Option Card installed or, their Option card can not conflict with the type A Option Fabric. Likewise, if blades are powered on before a chassis interconnect fabric device, the blades configuration will dictate whether the chassis interconnect fabric device is allowed to power on. If an incompatibility exists, The New Blade or the new chassis interconnect fabric device will not be allowed to Power on and the customer will be notified as of the offending device.

Figure 4:
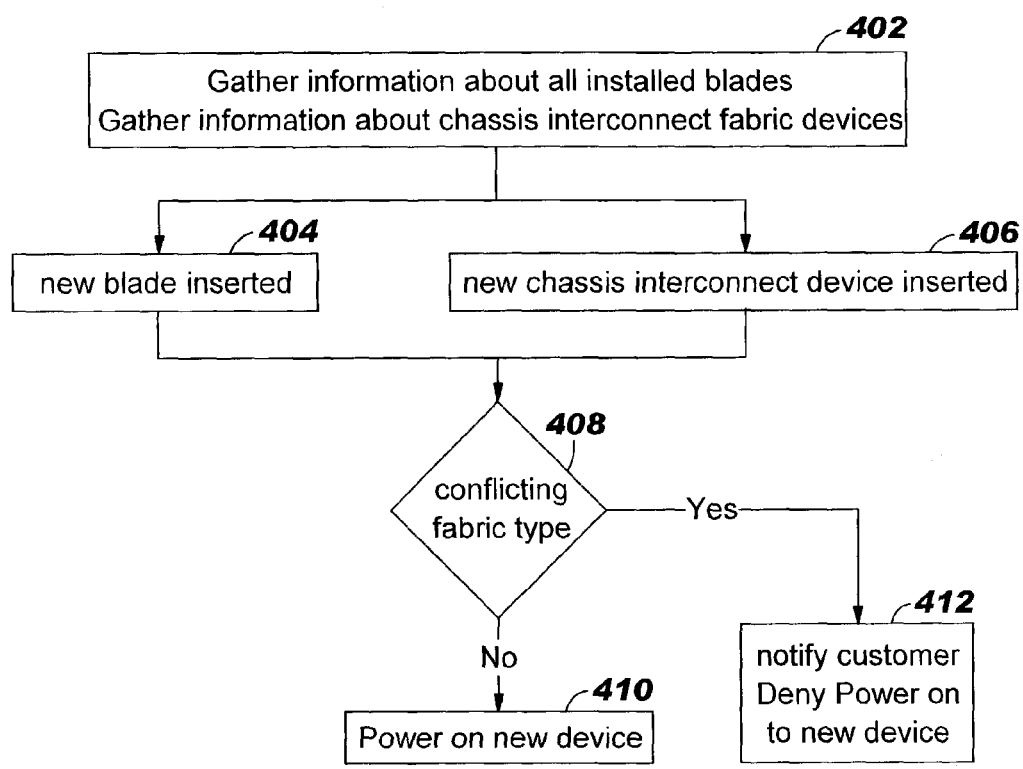
FIG. 4 shows a flowchart of a program that applies when a blade is inserted in a live or working chassis.

FIG. 4 shows a flow chart of a program executed on the Service Processor PM112' (FIG. 1) to handle power authorization to hot plugged modules (blades and/or interconnect devices). The program includes blocks 402 through 412. In block 402, the program collects information (such as fabric type) about all installed blades and interconnect devices. In block 404 a new blade is hot plugged. If the fabric type of the new blade is the same as the already installed ones (block 408), power is permitted on this hot-plugged module (block 410). Otherwise, power is denied (block 412).

FIGS. 5 through 9 and ensuing description give an overview of a Server Blade System in which the above described invention is implemented.

Figure 5:
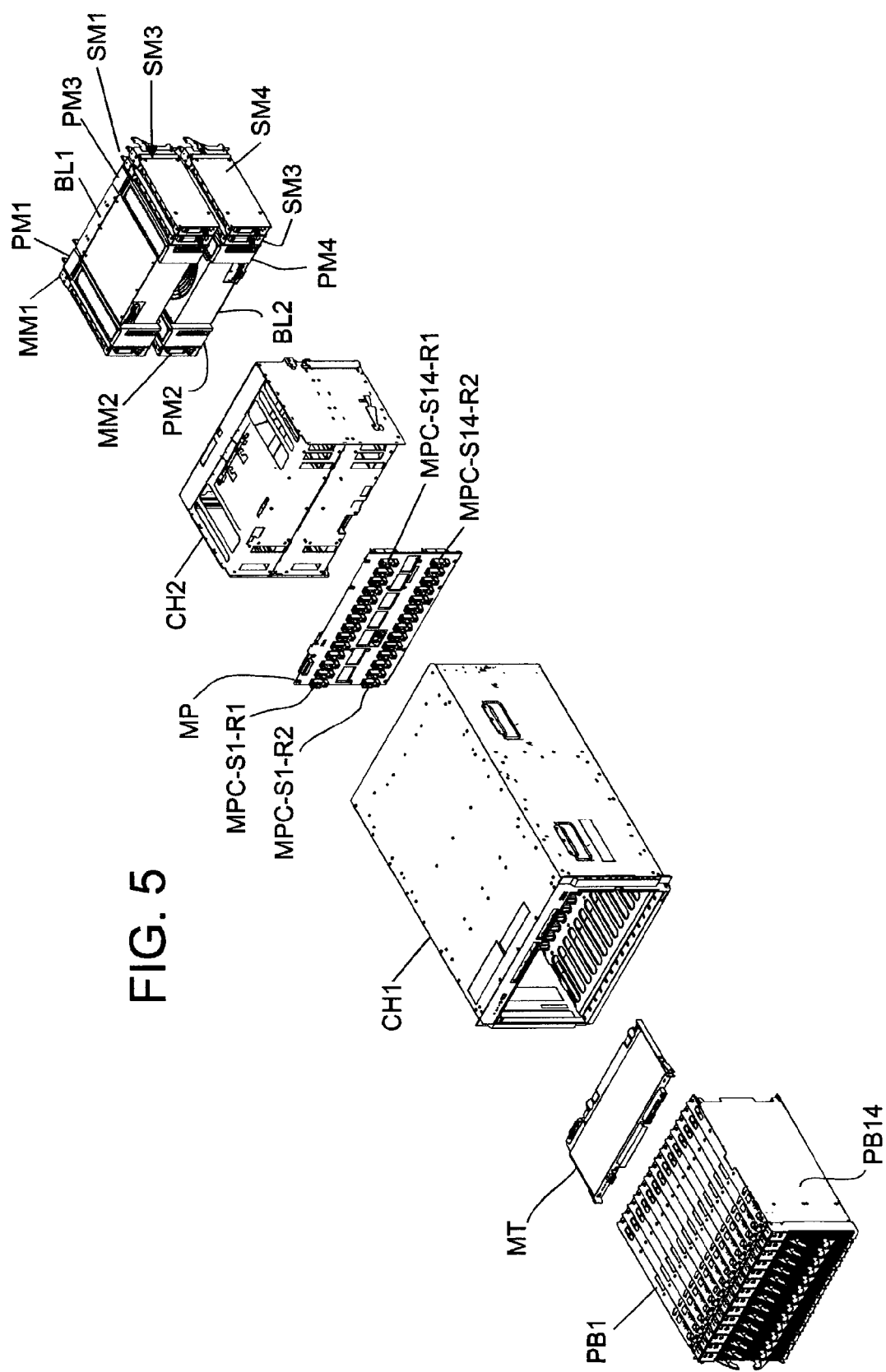
FIG. 5 is a front, top and right side exploded perspective view of a server blade system of the present invention.

FIG. 5 is a front, top and right side exploded perspective view of a server blade system. Referring to this figure, main chassis CH1 houses all the components of the server blade system. Up to 14 processor blades PB1 through PB14 (or other blades, such as storage blades) are hot plugable into the 14 slots in the front of chassis CH1. The term "server blade", "processor blade", or simply "blade" is used throughout the specification and claims, but it should be understood that these terms are not limited to blades that only perform "processor" or "server" functions, but also include blades that perform other functions, such as storage blades, which typically include hard disk drives and whose primary function is data storage.

Processor blades provide the processor, memory, hard disk storage and firmware of an industry standard server. In addition, they include keyboard, video and mouse ("KVM") selection via a control panel, an onboard service processor, and access to the floppy and CD-ROM drives in the media tray. A daughter card is connected via an onboard PCI-X interface and is used to provide additional high-speed links to switch modules SM3 and SM4 (described below). Each processor blade also has a front panel with 5 LED's to indicate current status, plus four push-button switches for power on/off, selection of processor blade, reset, and NMI for core dumps for local control.

Blades may be 'hot swapped' without affecting the operation of other blades in the system. A server blade is typically implemented as a single slot card (394.2 mm×226.99 mm); however, in some cases a single processor blade may require two slots. A processor blade can use any microprocessor technology as long as it is compliant with the mechanical and electrical interfaces, and the power and cooling requirements of the server blade system.

For redundancy, processor blades have two signal and power connectors; one connected to the upper connector of the corresponding slot of midplane MP (described below), and the other connected to the corresponding lower connector of the midplane. Processor Blades interface with other components in the server blade system via the following midplane interfaces: 1) Gigabit Ethernet (2 per blade; required); 2) Fibre Channel (2 per blade; optional); 3) management module serial link; 4) VGA analog video link; 4) keyboard/mouse USB link; 5) CD-ROM and floppy disk drive ("FDD") USB link; 6) 12 VDC power; and 7) miscellaneous control signals. These interfaces provide the ability to communicate with other components in the server blade system such as management modules, switch modules, the CD-ROM and the FDD. These interfaces are duplicated on the midplane to provide redundancy. A processor blade typically supports booting from the media tray CDROM or FDD, the network (Fibre channel or Ethernet), or its local hard disk drive.

A media tray MT includes a floppy disk drive and a CD-ROM drive that can be coupled to any one of the 14 blades. The media tray also houses an interface board on which is mounted interface LED's, a thermistor for measuring inlet air temperature, and a 4-port USB controller hub. System level interface controls consist of power, location, over temperature, information, and general fault LED's and a USB port.

Midplane circuit board MP is positioned approximately in the middle of chassis CH1 and includes two rows of connectors; the top row including connectors MPC-S1-R1 through MPC-S14-R1, and the bottom row including connectors MPC-S1-R2 through MPC-S14-R2. Thus, each one of the 14 slots includes one pair of midplane connectors located one above the other (e.g., connectors MPC-S1-R1 and MPC-S1-R2) and each pair of midplane connectors mates to a pair of connectors at the rear edge of each processor blade (not visible in FIG. 5).

Figure 6:
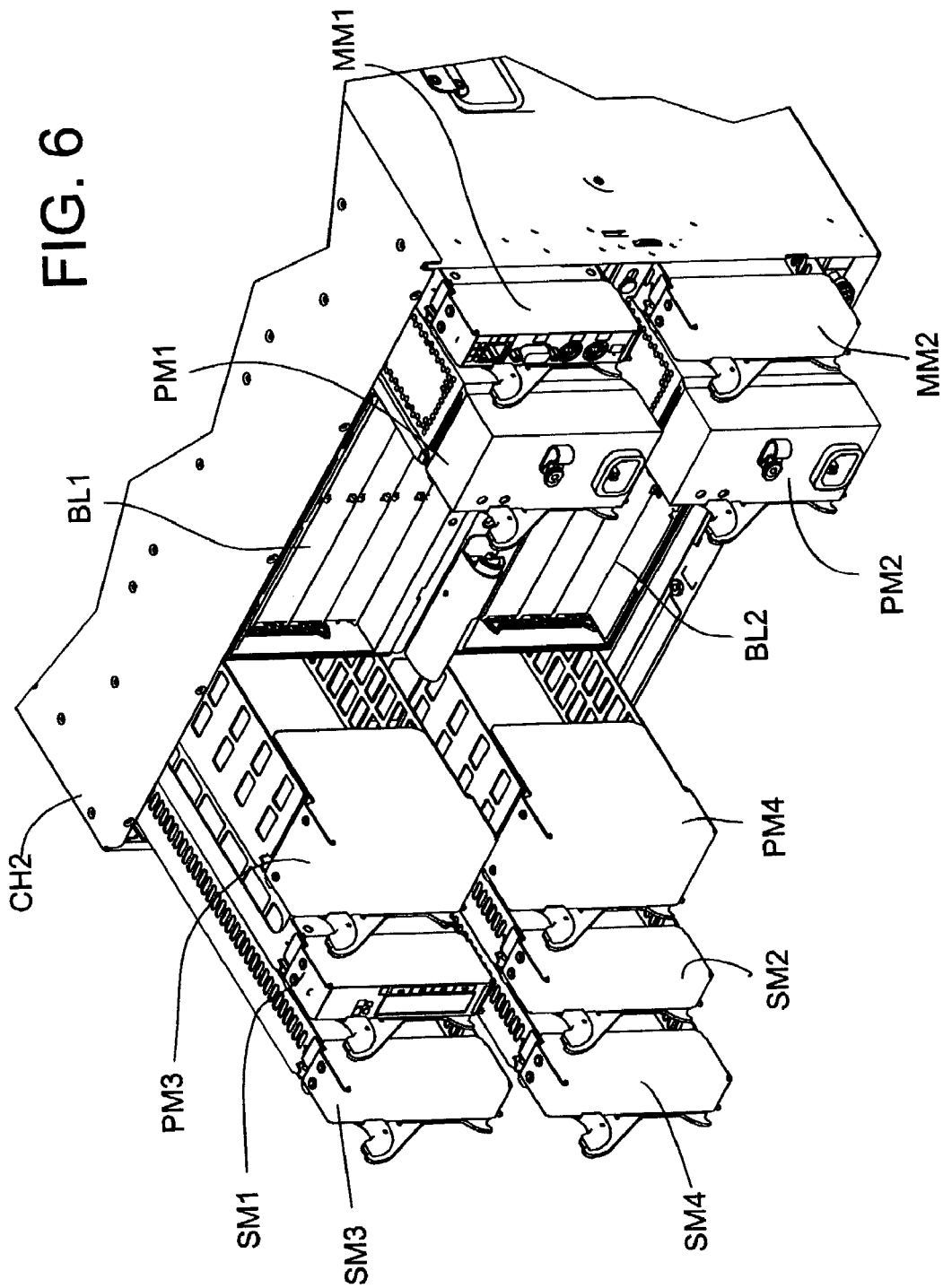
FIG. 6 is a rear, top and left side perspective view of the rear portion of the server blade system.

FIG. 6 is a rear, top and left side perspective view of the rear portion of the server blade system. Referring to FIGS.

5 and 6, a chassis CH2 houses various hot plugable components for cooling, power, control and switching. Chassis CH2 slides and latches into the rear of main chassis CH1.

Two hot plugable blowers BL1 and BL2 include backward-curved impeller blowers and provide redundant cooling to the server blade system components. Airflow is from the front to the rear of chassis CH1. Each of the processor blades PB1 through PB14 includes a front grille to admit air, and low-profile vapor chamber based heat sinks are used to cool the processors within the blades. Total airflow through the system chassis is about 300 CFM at 0.7 inches H2O static pressure drop. In the event of blower failure or removal, the speed of the remaining blower automatically increases to maintain the required air flow until the replacement unit is installed. Blower speed control is also controlled via a thermistor that constantly monitors inlet air temperature. The temperature of the server blade system components are also monitored and blower speed will increase automatically in response to rising temperature levels as reported by the various temperature sensors.

Four hot plugable power modules PM1 through PM4 provide DC operating voltages for the processor blades and other components. One pair of power modules provides power to all the management modules and switch modules, plus any blades that are plugged into slots 1–6. The other pair of power modules provides power to any blades in slots 7–14. Within each pair of power modules, one power module acts as a backup for the other in the event the first power module fails or is removed. Thus, a minimum of two active power modules are required to power a fully featured and configured chassis loaded with 14 processor blades, 4 switch modules, 2 blowers, and 2 management modules. However, four power modules are needed to provide full redundancy and backup capability. The power modules are designed for operation between an AC input voltage range of 200 VAC to 240 VAC at 50/60 Hz and use an IEC320 C14 male appliance coupler. The power modules provide +12 VDC output to the midplane from which all server blade system components get their power. Two +12 VDC midplane power buses are used for redundancy and active current sharing of the output load between redundant power modules is performed.

Management modules MM1 through MM4 are hot-plugable components that provide basic management functions such as controlling, monitoring, alerting, restarting and diagnostics. Management modules also provide other functions required to manage shared resources, such as the ability to switch the common keyboard, video, and mouse signals among processor blades.

Figure 7:
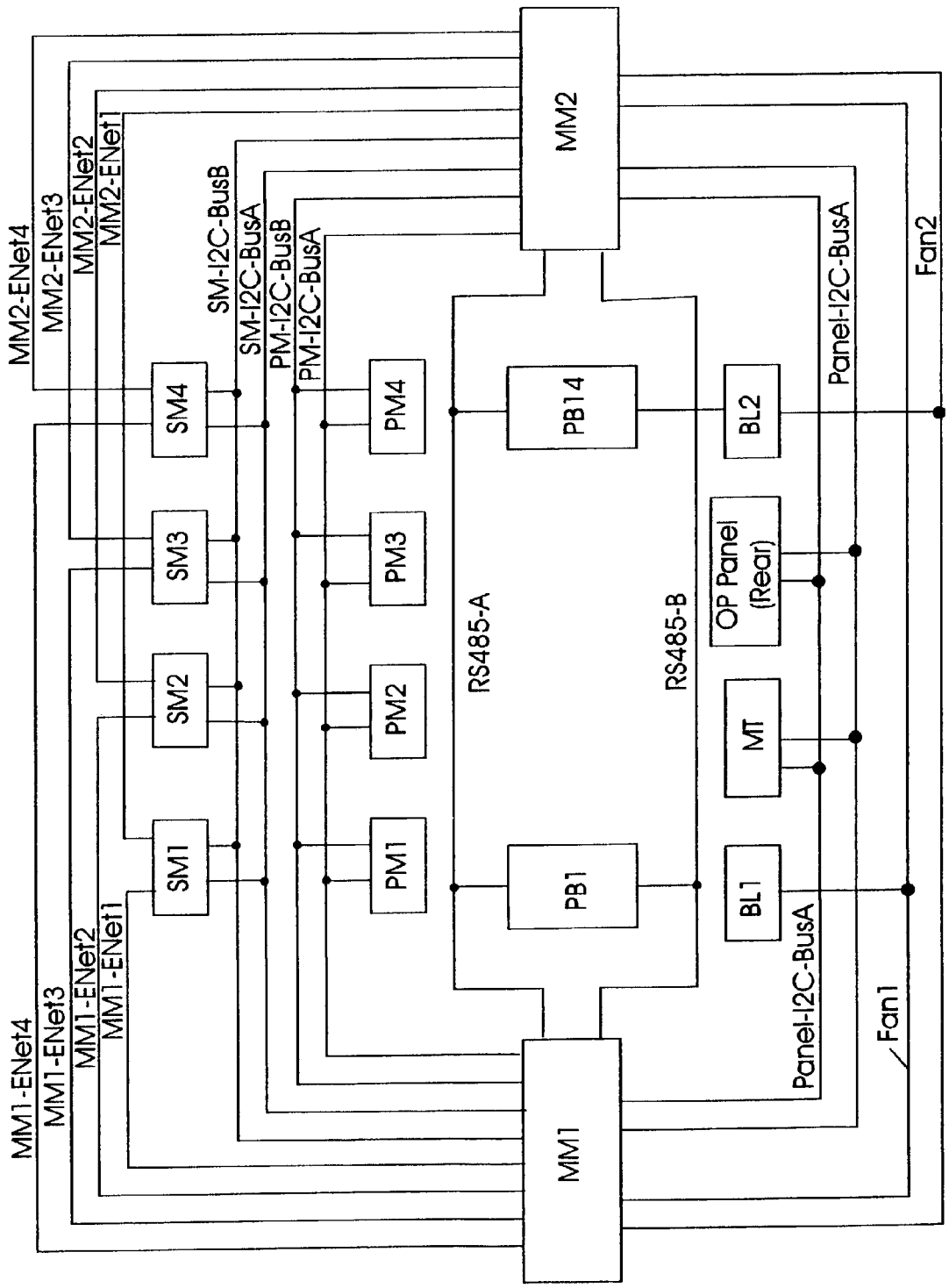
FIG. 7 is a schematic diagram of the server blade system's management subsystem.

FIG. 7 is a schematic diagram of the server blade system's management subsystem. Referring to this figure, each management module has a separate Ethernet link to each one of the switch modules SM1 through SM4. Thus, management module MM1 is linked to switch modules SM1 through SM4 via Ethernet links MM1-ENet1 through MM1-ENet4, and management module MM2 is linked to the switch modules via Ethernet links MM2-ENet1 through MM2-ENet4. In addition, the management modules are also coupled to the switch modules via two well known serial I2C buses SM-I2C-BusA and SM-I2C-BusB, which provide for "out-of-band" communication between the management modules and the switch modules. Similarly, the management modules are also coupled to the power modules PM1 through PM4 via two serial I2C buses PM-I2C-BusA and PM-I2C-BusB. Two more I2C buses Panel-I 2C-BusA and Panel-I2C-BusB are coupled to media tray MT and the rear panel. Blowers BL1 and BL2 are controlled over separate serial buses Fan1 and Fan2. Two well known RS485 serial buses RS485-A and RS485-B are coupled to server blades PB1 through PB14 for "out-of-band" communication between the management modules and the server blades.

Figure 8:
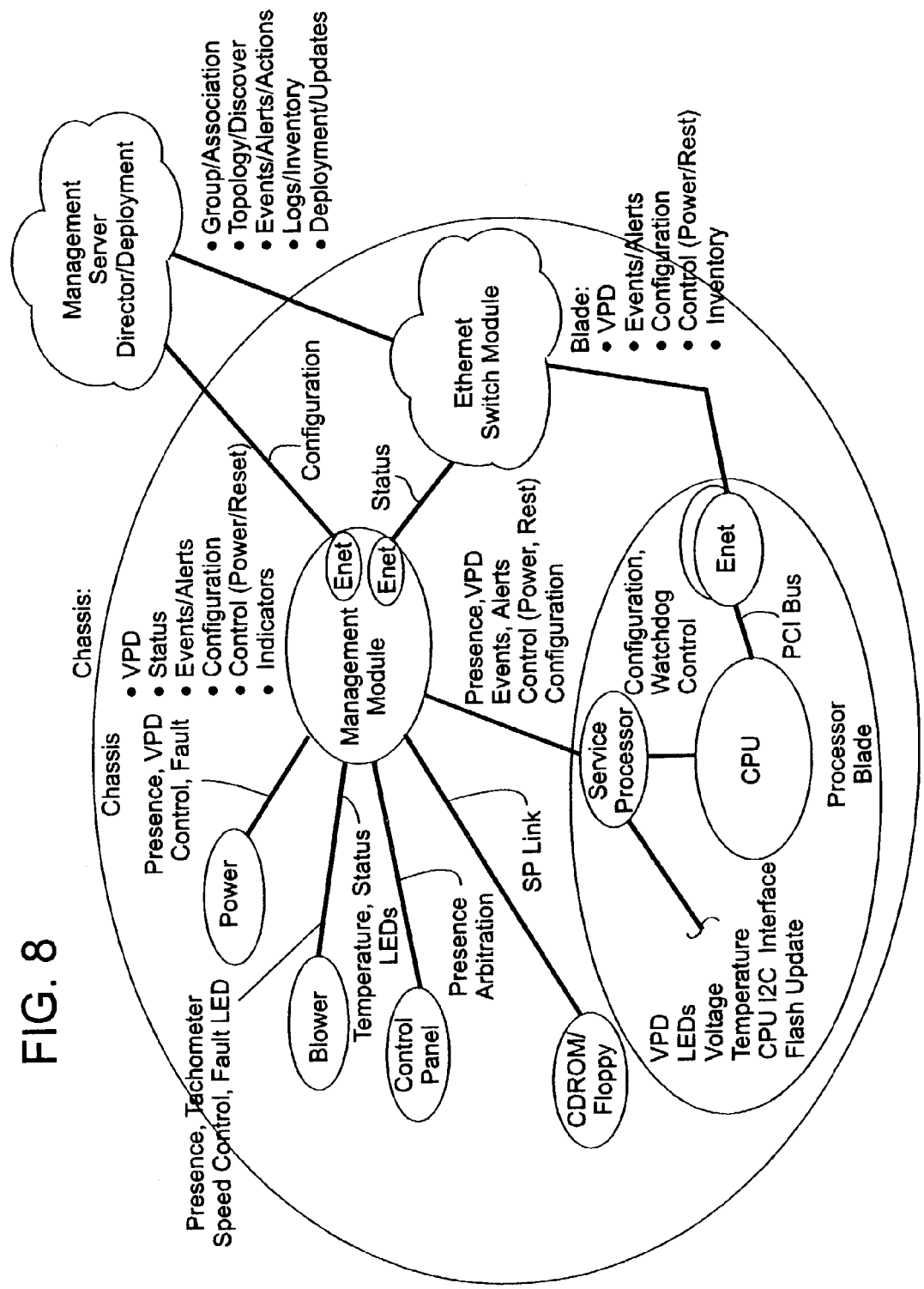
FIG. 8 is a topographical illustration of the server blade system's management functions.

FIG. 8 is a topographical illustration of the server blade system's management functions. Referring to FIGS. 7 and 8, each of the two management modules has a 100 Mbps Ethernet port that is intended to be attached to a private, secure management server. The management module firmware supports a web browser interface for either direct or remote access. Each processor blade has a dedicated service processor (SP) for sending and receiving commands to and from the management modules. The data ports that are associated with the switch modules can be used to access the processor blades for image deployment and application management, but are not intended to provide chassis management services. A management and control protocol allows the management module to authenticate individual blades as part of the blade activation procedure. A management module can also send alerts to a remote console to indicate changes in status, such as removal or addition of a blade or module. A management module also provides access to the internal management ports of the switch modules and to other major chassis subsystems (power, cooling, control panel, and media drives).

The management module communicates with each processor blade service processor via the out-of-band serial bus, with one management module acting as the master and the processor blade's service processor acting as a slave. For redundancy, there are two serial busses (one bus per midplane connector) to communicate with each processor blade's service processor. The processor blade is responsible for activating the correct interface to the top or bottom midplane connector based upon the state of the signals from the active management module. When two management modules are installed, the module in slot 1 will normally assume the active management role, while the module in slot 2 will be reserved as a standby module. In event of management module failure or removal after the chassis subsystems have been initialized, the operation of the processor blades and switch subsystems are not affected. Thus, if both management modules are inactive or removed, the server blade system's components will continue to function, but chassis configuration cannot be changed. Addresses are hardwired for each slot on each top and bottom midplane connector, and used by a processor blade's service processor to determine which processor blade is being addressed on the serial bus.

Each of the four switch modules SM1 through SM4 has a dedicated 100 Mbps Ethernet link to the two management modules MM1 and MM2. This provides a secure high-speed communication path to each of the switch modules for control and management purposes only. The I2C serial links are used by the management module to internally provide control of the switch module and to collect system status and vendor product data ("VPD") information. To accomplish this, the various control and data areas within the switch modules, such as status and diagnostic registers and VPD information, are accessible by the management module firmware. In general, the active management module can detect the presence, quantity, type, and revision level of each blade, power module, blower, and midplane in the system, and can detect invalid or unsupported configurations (e.g., processor blades with Fibre Channel daughter cards connected to Ethernet switch modules.) This function relies upon VPD information within each subsystem as well as signals from the various hardware interfaces or communication via the service processor protocols.

Figure 9:
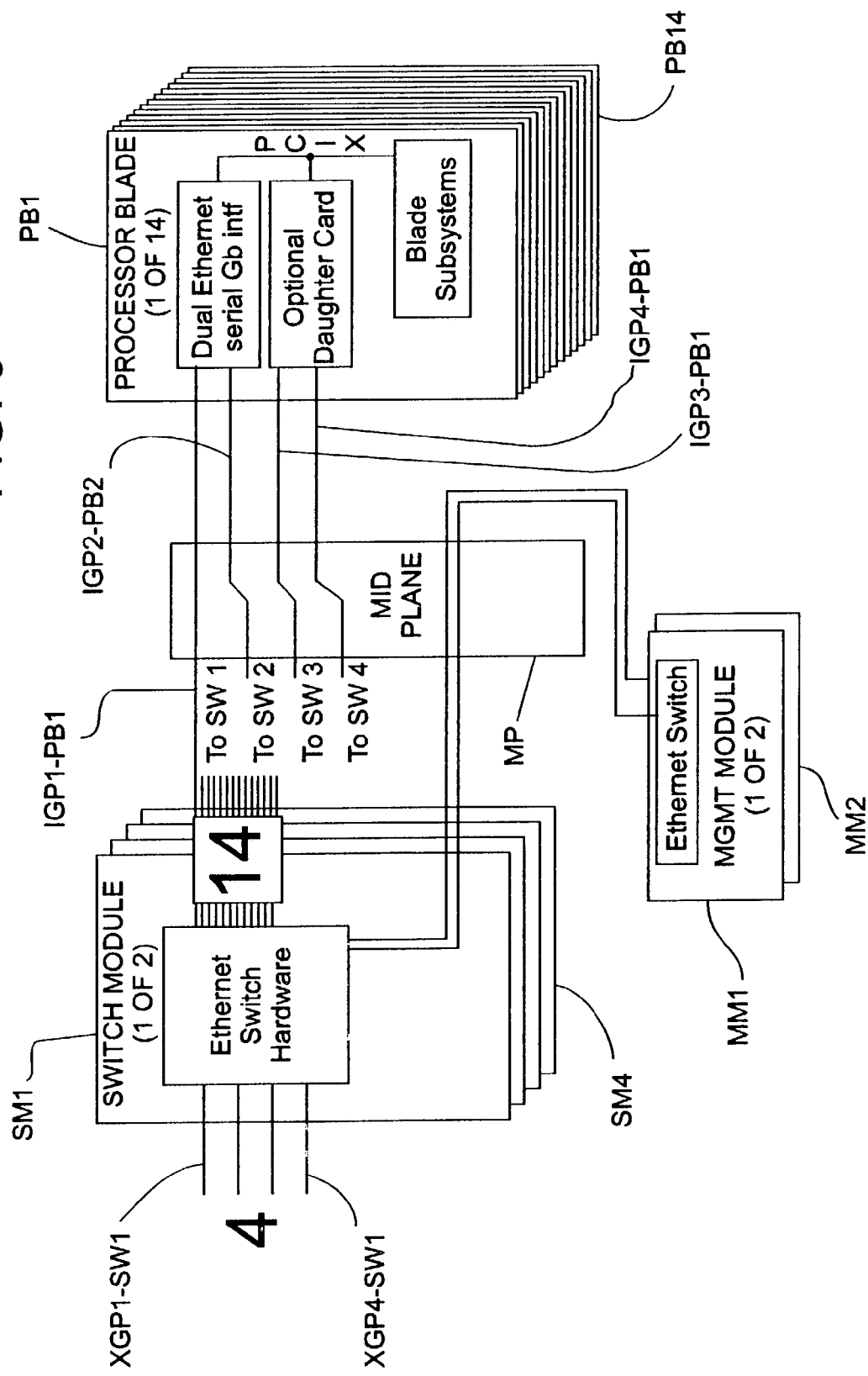
FIG. 9 is a block diagram of the switch module and processor blade interconnection.

FIG. 9 is a block diagram of the switch module and processor blade interconnection. Referring to this figure, each switch module SW1 through SW4 includes four external gigabit ports. For example, switch module SW1 includes external gigabit ports XGP1-SW1 through XGP4-SW1. Each processor blade includes four internal gigabit ports coupling the processor blade to each one of the four switch modules through the midplane connectors. For example, processor blade PB1 includes four internal gigabit ports IGP1-PB1 through IGP4-PB1. In addition, each management module is coupled to the switch module via an Ethernet link.

The Ethernet Switch Modules are hot-pluggable components that provide Ethernet switching capabilities to the server blade system. The primary purpose of the switch module is to provide Ethernet interconnectivity between the processor blades, management modules and the outside network infrastructure. Depending on the application, the external Ethernet interfaces may be configured to meet a variety of requirements for bandwidth and function. One Ethernet switch module is included in the base system configuration, while a second Ethernet switch module is recommended for redundancy. Each processor blade has a dedicated, 1000 Mbps (1 Gbps) full-duplex SERDES link to each of the two switch modules, and each switch module has four external 1 Gbps (RJ45) ports for connection to the external network infrastructure.

Fibre Channel (FC) is an industry standard networking scheme for sharing remote storage devices among a group of servers. Each processor blade includes a connector to accept a Fibre Channel daughter board containing two Fibre Channel ports of 2 Gb each for connection to dual Fibre Channel switch modules. The routing of the Fibre Channel signals occurs through the midplane to the Fibre Channel switch modules in slots 3 and 4 in the rear of the server blade chassis. Each Fibre Channel switch module is hot-pluggable without disruption of blade or chassis operation. The routing of the two Fibre Channel ports is such that one port from each processor blade is wired to one Fibre Channel switch module, and the other port is wired to the other Fibre Channel switch module to provide redundancy. Each Fibre Channel switch module has 2 external 2 Gb ports for attachment to the external Fibre Channel switch and storage infrastructure. This option allows each of the 14 processor blades to have simultaneous access to a Fibre Channel based storage area network (SAN) as well as the Ethernet based communications network.

It is to be understood that the above described arrangements are merely illustrative of the application of principles of the invention and that other arrangements may be devised by someone skilled in the art without departing from the spirit and scope of the invention.

What is claimed is:

1. A method to hot-plug a module into the chassis of a server said method comprising:
   (a) determining fabric type of modules already in the chassis when the module is being hot-plugged, said fabric type corresponding to a transfer method of data to and from routing components;
   (b) determining fabric type of the hot-plugged module; and
   (c) correlating fabric types in (a) and (b) to determine which power permission state to apply to the hot-plugged module, wherein said power permission state is determined from among granting permission to power on the hot-plugged module and not granting permission to power on the hot-plugged module.

2. The method of claim 1, wherein the hot-plugged, module is permitted to power on if the correlation indicates the fabric type of the hot-plugged module to be identical to fabric type of already installed modules that have been given power permission.

3. The method of claim 2, wherein said power on of the hot-plugged module includes providing the hot-plugged module with a pre-set power input that is received by each component that is connected to the chassis via the fabric type of the modules already in the chassis and powered on.

4. The method of claim 1, wherein power is denied to the hot-plugged module if correlation indicates conflicting fabric types between the hot-plugged module and already installed modules that have been given power permission.

5. The method of claim 4, wherein the modules include blades, and said determining includes:
   instantiating messages between a control software management module and a network swicth; and
   issuing messages to said blades to obtain information of the blades' peripherals, including a comparison of established fabric types associated with the blades.

6. The method of claim 4, wherein the modules include interconnect devices.

7. The method of claim 6, wherein the interconnect device includes network or connectivity switches, wherein said switches are electrically and mechanically keyed substantially similar to each other.

8. The method of claim 4, wherein the fabric type includes one or more of Ethernet and fibre.

9. A server including:
   a chassis with at least one blade and at least one interconnecting device fully powered;
   at least one module hot-plugged into said chassis; p1 a controller to determine fabric type of the blade, the module and the interconnecting device, said fabric type corresponding to a transfer method of data to and from routing components; and
   said controller permitting power to be applied to said at least one module if all fabric types are compatible and denying permission to add power to said at least one module if the fabric types are incompatible.

10. A method to power modules in a server, said method comprising:
   (a) using a first routine to apply full power to modules inserted in said server before power-on;
   (b) hot-plugging a module into a slot of said server subsequent to power-on;
   (c) determining fabric type of modules in step (a), said fabric type corresponding to a transfer method of data to and from routine components;
   (d) determining fabric type of hot-plugged module in step (b);
   (e) correlating fabric types determined in step (c) and step (d); and
   (f) depending on results of the correlation in step (e) determine a power permission state for said hot plugged module, wherein said power permission state is determined from among granting permission to power on the hot-plugged module and not granting permission to power on the hot-plugged module.

11. The method of claim 10 wherein the module includes a blade.

12. The method of claim 10 wherein the module includes a connector.

13. The method of claim 12 wherein the connector includes switches.

14. The method of claim 13 wherein the switches include ethernet.

15. The method of claim 10 wherein full-power is permitted to be applied to said hot plugged module if the fabric type of the hot plugged module is compatible with fabric type of modules inserted in the server prior to power-on that have been given power permission.

16. The method of claim 10 wherein full power is denied to said hot-plugged module if the fabric type of said hot-plugged module is incompatible with fabric type of modules installed in the server prior to power-on.

17. A program product including a medium on which computer readable program is recorded, said program including:
   (a) instructions to determine fabric type of a first set of modules, said fabric type corresponding to a transfer method of data to and from routing components;
   (b) instructions to determine fabric type of another module;
   (c) instructions to correlate fabric types in (a) and (b) to determine a power permission state to apply to the another module, wherein said power permission state is determined from among granting permission to power on the hot-plugged module and not granting permission to power on the hot-plugged module.

18. The program product of claim 17, further comprising:
   (d) instructions for providing the hot-plugged module with permission to power on if the correlation indicates the fabric type of the hot-plugged module to be identical to fabric type of already installed modules that have been given power permission; and
   (e) instructions for withholding giving permission to power on to the hot-plugged module if the correlation indicates conflicting fabric types between the hot-plugged module and already installed modules that have been given power permission.

19. The program product of claim 17, wherein:

the first set of modules includes one of blades and include interconnect devices, such as switches; and the fabric type includes one of Ethernet and fibre.

* * * * *